(12) United States Patent
Schietecatte

(10) Patent No.: US 6,192,855 B1
(45) Date of Patent: Feb. 27, 2001

(54) CONTROL METHOD

(75) Inventor: Thierry Schietecatte, Orleans (FR)

(73) Assignee: Lucas Industries PLC (GB)

( * ) Notice: Subject to any disclaimer, the term of this patent is extended or adjusted under 35 U.S.C. 154(b) by 0 days.

(21) Appl. No.: 09/312,507

(22) Filed: May 14, 1999

(30) Foreign Application Priority Data

May 20, 1998 (GB) .................................. 9810726

(51) Int. Cl.⁷ ............................. F02D 41/14; F02D 41/40
(52) U.S. Cl. ........................................................ 123/299
(58) Field of Search ................................ 123/299, 300, 123/435

(56) References Cited

U.S. PATENT DOCUMENTS

| 5,005,549 | * | 4/1991 | Pernpeintner et al. | 123/435 |
| 5,408,863 | | 4/1995 | Sawyers et al. | 73/35.05 |
| 5,482,016 | * | 1/1996 | Ohishi et al. | 123/299 |

FOREIGN PATENT DOCUMENTS

| 196 12 179 | 8/1997 | (DE) . |
| 2 277 173 | 10/1994 | (GB) . |
| 2 305 727 | 4/1997 | (GB) . |
| 7-12002 | * 1/1995 | (JP) . |
| 9-144583 | * 6/1997 | (JP) . |

OTHER PUBLICATIONS

Patent Abstracts of Japan, vol. 012, No. 404 (M–757), Oct. 26, 1988 & JP 63 147956 A (Nippon Denso Co. Ltd.; others: 01), Jun. 20, 1988.

* cited by examiner

Primary Examiner—Andrew M. Dolinar
(74) Attorney, Agent, or Firm—Andrus Sceales, Starke & Sawall

(57) ABSTRACT

A method of controlling the operation of a fuel injector of a fuel system using a control system of the type comprising an accelerometer associated with an engine and arranged to sense vibrations thereof, and monitor means arranged to monitor the output signal of the accelerometer to detect vibrations of the engine, is described. The method comprises applying a drive pulse to the injector, using the monitor means and the accelerometer to determine whether or not the application of the drive pulse results in combustion in the cylinder of the engine associated with the injector, and modifying the duration of the drive pulse to determine the minimum pulse length which must be applied to the injector to cause combustion.

9 Claims, 3 Drawing Sheets

CONTROL METHOD

BACKGROUND OF THE INVENTION

This invention relates to a method for use in controlling the operation of the fuel system of a compression ignition internal combustion engine. The invention is particularly applicable to controlling the quantity of fuel supplied during a pilot injection which, in use, is followed by a main injection.

It has been found that the levels of combustion noise and emissions produced by a diesel engine can be reduced by supplying each cylinder with a small pilot injection prior to supplying a main injection to the cylinder. It is desirable to be able to monitor the operation of an injector in order to accurately control the quantity of fuel supplied in the pilot injection.

GB 2305727 describes a method for determining the minimum drive pulse length which must be applied to an injector to cause delivery of fuel, the method involving filtering the output of an engine mounted sound sensor to provide a signal indicative of movement of a valve needle of the injector.

SUMMARY OF THE INVENTION

According to the present invention there is provided a method of controlling the operation of a fuel injector of a fuel system using a control system of the type comprising an accelerometer associated with an engine and arranged to sense vibrations thereof, and monitor means arranged to monitor the output signal of the accelerometer to detect vibrations of the engine, the method comprising applying a drive pulse to the injector to cause delivery of a pilot injection of fuel, using the monitor means and the accelerometer to determine whether or not the application of the drive pulse results in combustion in the cylinder of the engine associated with the injector, and modifying the duration of the drive pulse to determine the minimum pulse length which must be applied to the injector to cause combustion.

Combustion is conveniently sensed by filtering the output of the accelerometer using a band pass filter which passes vibrations caused by combustion and noise at a frequency falling, for example, within the range 6–8 kHz, and comparing the filtered signal with a similarly filtered signal derived from a point in the operating cycle of the engine where it is known that combustion is not occurring in order to compensate for background noise.

The minimum drive pulse length which results in combustion of fuel can be used in subsequent control of that injector to accurately control the quantity of fuel supplied by the injector both during pilot injections and during subsequent main injections, in use.

The method further permits the quantity of fuel delivered during the pilot injection to be monitored. If the ratio of the filtered signal indicative of the level of combustion and noise to that of noise alone becomes too high, then this indicates that the quantity of fuel delivered is too high, and the drive pulse length is reduced. If the ratio remains too high, an indication may be produced that a fault has occurred in the operation of the injector.

BRIEF DESCRIPTION OF THE DRAWINGS

The invention will further be described, by way of example, with reference to the accompanying drawings, in which.

DETAILED DESCRIPTION OF THE INVENTION

Figure 1:
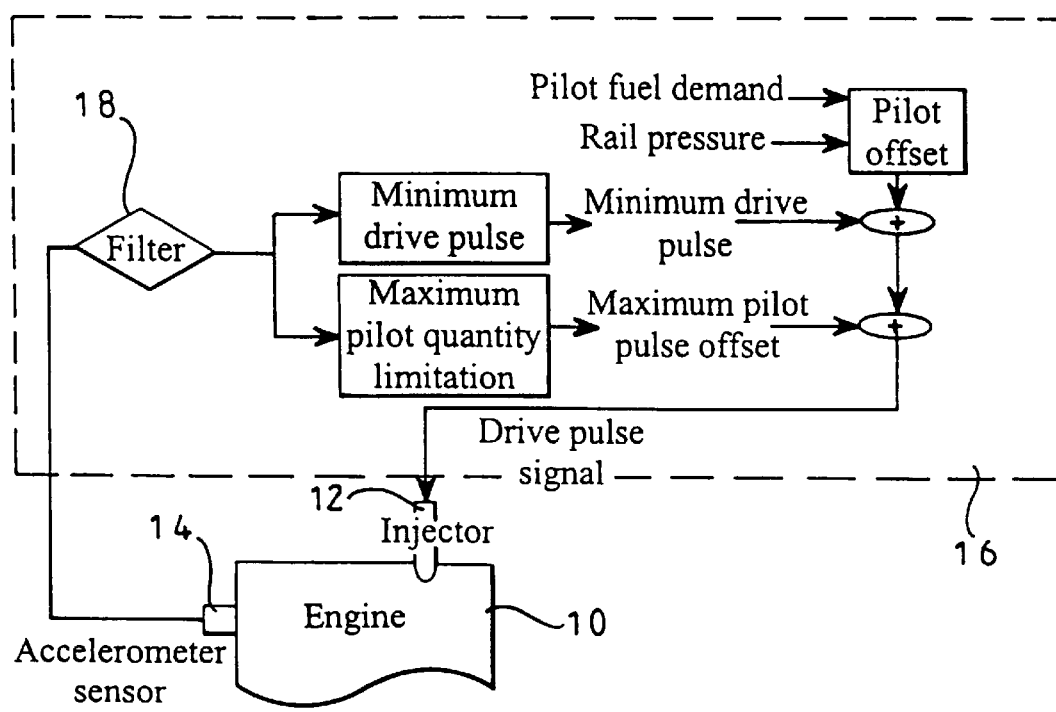
FIG. 1 is a diagrammatic view of a control system which uses a control method in accordance with an embodiment of the invention.
Figure 2A:
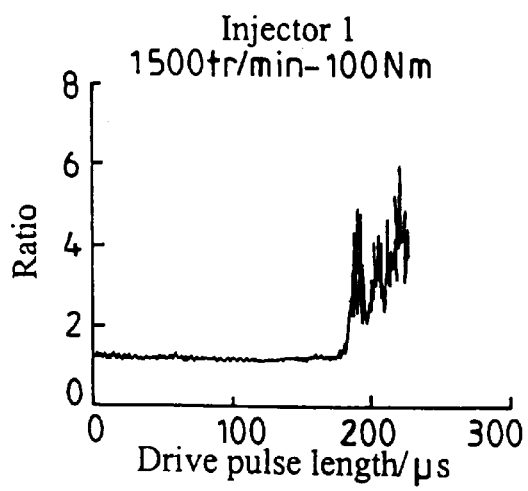
FIGS. 2a–2d are a series of graphs illustrating the operation of the invention.
Figure 2B:
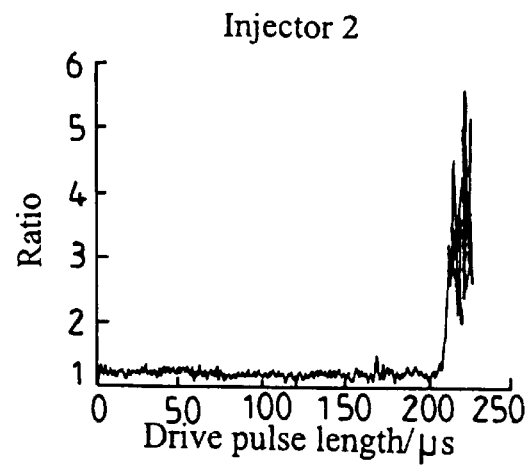
Figure 2C:
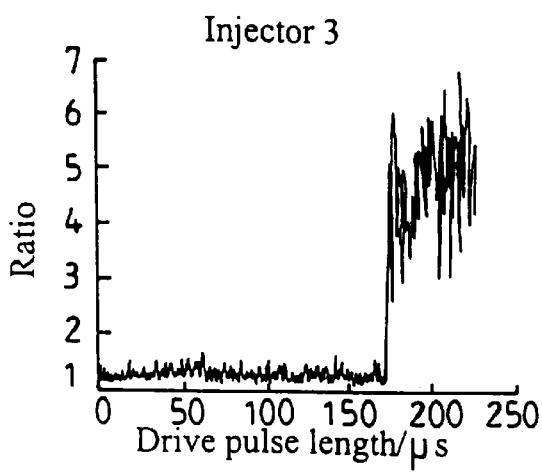
Figure 2D:
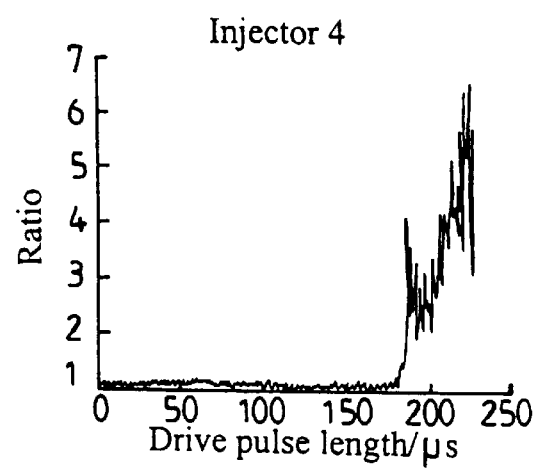

The engine 10 illustrated in FIG. 1 is arranged to be supplied with fuel by a fuel system including a low pressure fuel pump arranged to draw diesel fuel from a fuel reservoir, and supply the fuel through a filter to an inlet of a high pressure fuel pump. The high pressure fuel pump is arranged to charge a common rail with fuel at high pressure. Connected to the common rail is a plurality of injectors 12, only one of which is shown in FIG. 1, each of the injectors 12 being electromagnetically actuable under the control of an electronic control unit 16. The electronic control unit 16 also controls the operation of the high pressure fuel pump by controlling a throttle thereof, and controls the fuel pressure within the common rail by controlling the operation of a control valve, the electronic control unit 16 being supplied with information relating to the fuel pressure within the common rail by a pressure sensor. In addition to receiving signals indicative of the fuel pressure within the common rail, the electronic control unit 16 is supplied with signals indicative of a number of other engine parameters, for example engine speed and position, and accelerator pedal position, using appropriate sensors.

Fuel delivered by the injectors 12 is injected into respective cylinders of the engine 10, and as indicated in FIG. 1, the engine 10 has mounted thereon an acceleration sensor 14. The output signal from the acceleration sensor 14 is supplied to the electronic control unit 16 and is used in controlling the operation of the engine 10 by controlling the operation of the fuel system.

It will be appreciated that the electronic control unit 16 performs a large number of functions, and some of these functions are described hereinafter. As illustrated in FIG. 1, the output signal of the acceleration sensor 14 is passed through a band pass filter 18 which is arranged to pass vibration signals of frequency falling within the range, for example, 6–8 kHz. It will be appreciated that, depending upon the intended application, other frequency ranges may be used. The filtered signal is then amplified by an amplifier, full wave rectified by a rectifier, and the part of the signal falling within a detection window located just before the top-dead-centre position for the cylinder for which the signal relates is integrated by an appropriate integration circuit. An identical integration process is performed on the amplified and full wave rectified signal falling within a reference window located in a part of the waveform in which it is known that no combustion vibrations will occur.

The output of the integration circuit for both windows is supplied to a circuit in which a ratio of the integral of the part of the signal falling within the detection window and the part falling within the reference window is calculated. As described hereinafter, where no combustion occurs as a result of no fuel being injected to the engine cylinder, the waveform within the detection window should be similar to that within the reference window, and the ratio calculated by the circuit should be approximately equal to 1. If the ratio rises significantly above 1, then this is indicative that combustion is occurring.

In use, the injector 12 is controlled in such a manner as to deliver a pilot injection of fuel to the associated cylinder of the engine 10 within a detection window located between, for example, 5° and 15° before top dead-centre. The actual optimum position of the detection window may vary depending upon the application. Further, the optimum position of the detection window varies with engine speed and load. Such a timing for a pilot injection is later than usual, the normal period for supplying a pilot injection to an injector occurring, typically, between 40° and 50° prior to top dead-centre. It has been found that fuel is burnt more vigorously if it is supplied close to top dead-centre as the gases within the engine cylinder are much hotter due to compression. As the burning of fuel is more vigorous, the detection of very small combustion events may be detected more easily and with greater sensitivity. The application of a pilot injection at an instant between approximately 5° and 15° before top dead-centre may be achieved either by adjusting the timing of delivery of a normal pilot injection, or by supplementing the normal pilot injection with a second pilot injection occurring within this time window.

If, following the supply of a pilot injection to the cylinder of the engine 10, a combustion event is sensed, then for a subsequent pilot injection, the duration of the drive pulse supplied to the injector 12 to cause the pilot injection to occur is reduced. The reduction in the duration of the drive pulse reduces the duration of the injection, thus reducing the quantity of fuel supplied during the pilot injection. The duration of the drive pulse applied to the injector 12 continues to be reduced until no combustion event is sensed. The absence of a combustion event implies that no fuel was supplied during the pilot injection. The duration of a subsequent drive pulse applied to the injector 12 is increased by a small amount, the duration of the drive pulse increasing by small increments until a combustion event is sensed. The duration of the shortest drive pulse applied to the injector 12 to cause such a very small combustion event is taken to be the minimum drive pulse duration which causes the injection of fuel to the cylinder.

FIGS. 2a to 2d are a series of graphs showing the ratio of the filtered output signal of the accelerometer 14 for the detection window and the reference window over a range of drive pulse durations for four different injectors. The graph of FIG. 2a for injector 1 shows that the ratio has a value of approximately 1 for drive pulses of duration less than approximately 185 μs, indicating that for drive pulses of duration less than 185 μs, no fuel is delivered and no combustion takes place. For drive pulses of longer duration, the ratio rises indicating that combustion occurs, and thus that fuel is being delivered. The graph indicates that for injector 1, the minimum drive pulse duration which causes fuel delivery is approximately 185 μs. The graphs of FIGS. 2b–2d for the other injectors may be interpreted similarly to derive the minimum drive pulse durations for those injectors.

If, for a given common rail fuel pressure, the rate at which fuel is delivered by the injector 12 is known, then the quantity of fuel delivered during the pilot injection can be controlled accurately by supplementing the minimum drive pulse length to cause injection by that injector with the pulse length or offset necessary to cause the desired quantity of fuel to be injected by that injector.

Figure 3:
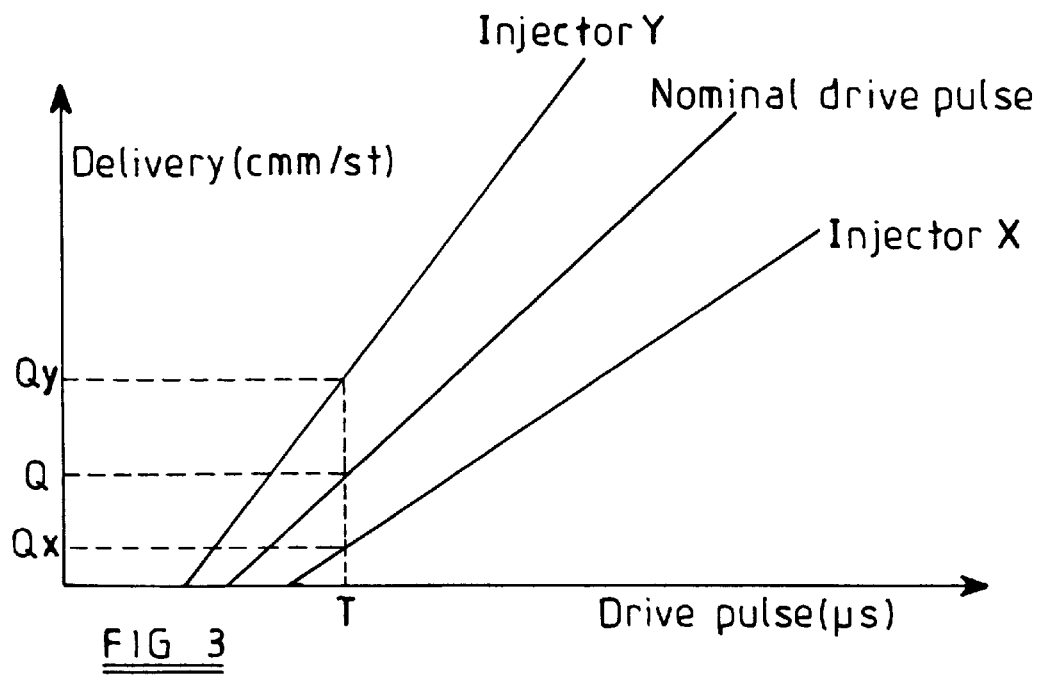
FIG. 3 is a graph illustrating the quantity of fuel delivered where the invention is not used.

FIG. 3 illustrates the effect of failing to compensate for variations in the minimum drive pulse duration for different injectors. In FIG. 3, the drive pulse duration which must be applied to injector X to cause injection is significantly greater than that of injector Y. The line labelled 'nominal drive pulse' in FIG. 3 is used to derive the drive pulse length T which should be applied to the injectors X, Y to cause delivery of fuel quantity Q. However, as a result of the differences in the minimum drive pulse lengths for injectors X and Y, and as a result of the different rates of injection permitted by these injectors, the actual quantities of fuel delivered, $Q_X$ and $Q_Y$, differ significantly from the desired quantity Q.

Figure 4:
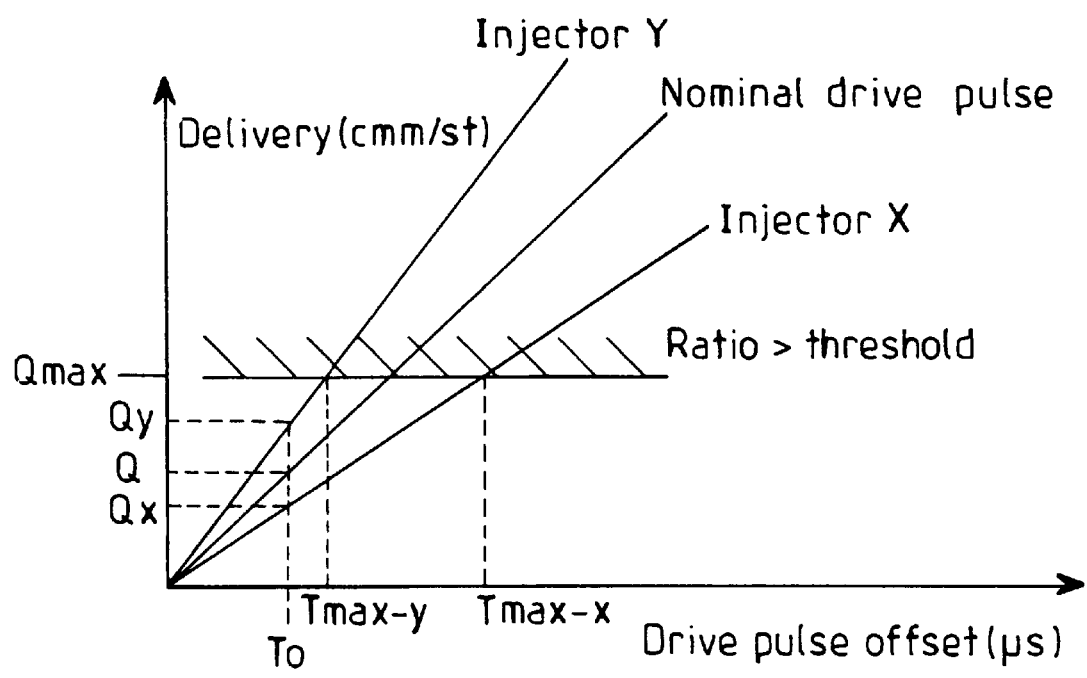
FIG. 4 is a graph similar to FIG. 3 illustrating the effect of using the invention.

By compensating for the different minimum drive pulse durations for the injector X, Y, and applying each injector with a drive pulse of duration equivalent to the sum of the minimum drive pulse length for that injector and an offset $T_O$ derived from the nominal drive pulse line shown in FIG. 4 for fuel quantity Q, it is apparent that the variation of $Q_X$ and $Q_Y$ from the desired quantity Q is reduced. The variation may be reduced further by compensating for the different rates of injection permitted by the different injectors.

The ratio of the filtered output signal produced during the pilot injection from the detection window with the output signal from the reference window used in order to compensate for background noise is proportional to the quantity of fuel injected during the pilot injection. It is possible to define a value $Q_{MAX}$ which represents the maximum quantity of fuel which may be injected during the pilot injection, and the corresponding threshold value of the ratio.

As illustrated in FIG. 1, in addition to adding the minimum drive pulse duration to the pilot offset, which is determined depending upon, for example, the quantity of fuel which is to be delivered and the rail pressure, a maximum pilot pulse offset is added to the drive pulse. The maximum pilot pulse offset always has a value of less than or equal to zero. The maximum pilot pulse offset is used to modify the pulse length to avoid the delivery of too great a quantity of fuel to the cylinder during the pilot injection.

If, upon the application of the drive pulse to the injector, the ratio of the filtered output signals of the accelerometer 14 for the detection window and the reference window exceeds a first threshold value, for example 3, then this indicates that the quantity of fuel being delivered is too high. In FIG. 4, the total offset values above which the quantity of fuel delivered is too high for injectors X and Y are indicated at $T_{MAX\_X}$ and $T_{MAX\_Y}$.

In order to compensate for this, the value of the maximum pilot pulse offset is reduced by an amount proportional to the difference between the value of the ratio and the first threshold value. The effect of this change is to reduce the pilot pulse length for, and hence the quantity of fuel delivered in, subsequent injections.

If, as a result of the reduction in the maximum pilot pulse offset, the ratio falls below the first threshold value then, provided increasing the maximum pilot pulse offset does not result in the value of the maximum pilot pulse offset increasing above zero, the maximum pilot pulse offset is gradually increased by predetermined, fixed, increments. If increasing the value of the maximum pilot pulse offset by the fixed increment would result in the maximum pilot pulse offset having a positive value, then the maximum pilot pulse offset is set at zero.

If the ratio rises above a second, higher threshold value, for example 5, then it is likely that the injector is operating incorrectly, for example leaking fuel into the cylinder, and a fault indication may be produced indicating that the fuel system requires maintenance or repair and recovery action may be taken so as not to cause damage to the engine.

What is claimed is:

1. A method of controlling the operation of a fuel injector of a fuel system using a control system of the type comprising an accelerometer associated with an engine having a cylinder associated with the injector, the accelerometer being arranged to sense vibrations of the engine and generating an output signal, and further comprising monitor means arranged to monitor the output signal of the accelerometer to detect vibrations of the engine, the method comprising applying a drive pulse to the injector to cause a pilot injection of fuel, using the monitor means and the accelerometer to determine whether or not the application of the drive pulse results in combustion in the cylinder, modifying the duration of the drive pulse to determine the minimum pulse length which must be applied to the injector to cause combustion, and calculating a ratio of the output signal of the accelerometer during a period in which commencement of combustion is expected to occur and that during a period in which combustion does not occur, and using the ratio to determine whether too much fuel is being delivered.

2. A method as claimed in claim 1, wherein the output of the accelerometer is filtered using a low frequency band-pass filter to remove from the output signals resulting from vibrations caused other than as a result of combustion.

3. A method as claimed in claim 2, wherein the filter passes signals indicative of vibrations of frequency falling within the range 6 to 8 kHz.

4. A method as claimed in claim 1, further comprising a step of compensating for noise in the output signal of the accelerometer.

5. A method as claimed in claim 4, wherein the step of compensating for noise comprises comparing the output signal of the accelerometer during a period during which combustion is expected to commence with that occurring during a period in which fuel combustion is not occurring.

6. A method as claimed in claim 1, further comprising a step of reducing the quantity of fuel delivered during subsequent injections in the event that it is determined that too much fuel is being delivered.

7. A method as claimed in claim 1, further comprising a step of producing a warning indicative of a fault in the event that it is determined that too much fuel is being delivered.

8. A method as claimed in claim 1, wherein the timing of the application of the drive pulse to the injector is such as to cause the commencement of the pilot injection to occur within a detection window located slightly before a top-dead-centre position.

9. A method as claimed in claim 8, wherein the detection window is located between 5° and 15° prior to top-dead-centre.

* * * * *